United States Patent
Tanji

(10) Patent No.: US 9,241,371 B2
(45) Date of Patent: Jan. 19, 2016

(54) APPARATUS AND METHOD FOR PERFORMING WIRELESS COMMUNICATION WITH A TERMINAL SWITCHING BETWEEN COMMUNICATION MODES

(71) Applicant: CANON KABUSHIKI KAISHA, Tokyo (JP)

(72) Inventor: Masamichi Tanji, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/183,950

(22) Filed: Feb. 19, 2014

(65) Prior Publication Data

US 2014/0269507 A1 Sep. 18, 2014

(30) Foreign Application Priority Data

Mar. 14, 2013 (JP) ................................. 2013-052432

(51) Int. Cl.
*H04W 88/10* (2009.01)
*H04W 76/04* (2009.01)
*H04W 84/12* (2009.01)

(52) U.S. Cl.
CPC ............ *H04W 88/10* (2013.01); *H04W 76/043* (2013.01); *H04W 84/12* (2013.01)

(58) Field of Classification Search
CPC ... H04W 88/10; H04W 88/06; H04W 76/043; H04W 76/023; H04W 84/00; H04W 84/02; H04W 84/12; H04W 84/18
See application file for complete search history.

(56) References Cited

U.S. PATENT DOCUMENTS

| 7,293,071 | B2 * | 11/2007 | Sato et al. | 709/217 |
|---|---|---|---|---|
| 8,493,896 | B2 * | 7/2013 | Yu et al. | 370/310 |
| 8,503,340 | B1 * | 8/2013 | Xu | 370/310 |
| 8,755,071 | B2 * | 6/2014 | Terashita | 358/1.15 |
| 2007/0169147 | A1 * | 7/2007 | Kii | 725/38 |
| 2009/0222537 | A1 * | 9/2009 | Watkins et al. | 709/221 |
| 2011/0122434 | A1 * | 5/2011 | Kim | 358/1.15 |
| 2012/0051345 | A1 * | 3/2012 | Vedantham et al. | 370/338 |

FOREIGN PATENT DOCUMENTS

JP 2012-113349 A 6/2012

* cited by examiner

*Primary Examiner* — Curtis A Alia
(74) *Attorney, Agent, or Firm* — Fitzpatrick, Cella, Harper & Scinto

(57) ABSTRACT

A communication apparatus for performing communication with a communication terminal, and a method of controlling the same. The apparatus performs wireless communication with the communication terminal by a first wireless communication mode and performs wireless communication with the communication terminal by a second wireless communication mode in which either the communication apparatus or the communication terminal becomes an access point. The apparatus receives a switching instruction of communication mode from a user, and determines whether or not the switching of the communication mode in accordance with the received switching instruction is executable, makes a request for an additional instruction to the user when it is determined that it is not executable, and controls the switching of the communication mode in accordance with an additional instruction in response to the request.

12 Claims, 16 Drawing Sheets

F I G. 1A
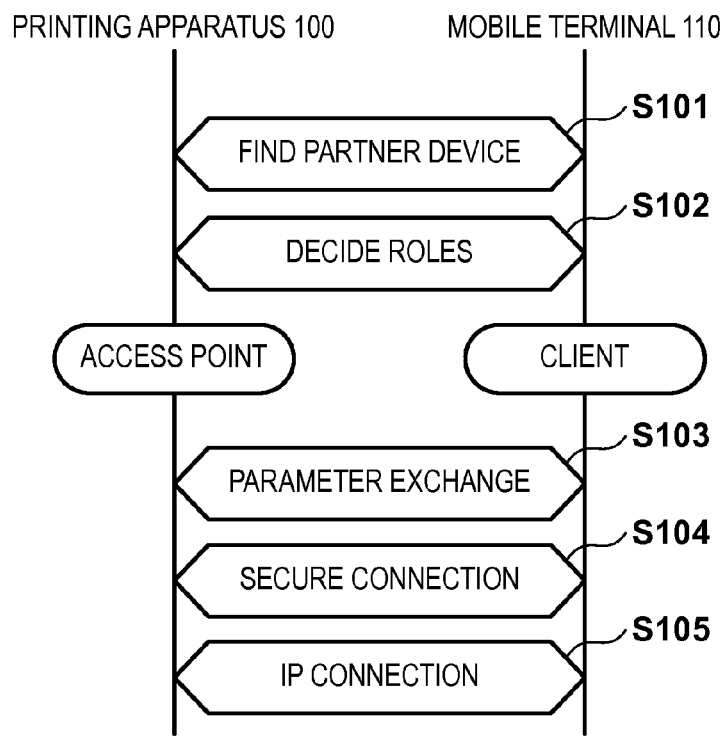
F I G. 1B
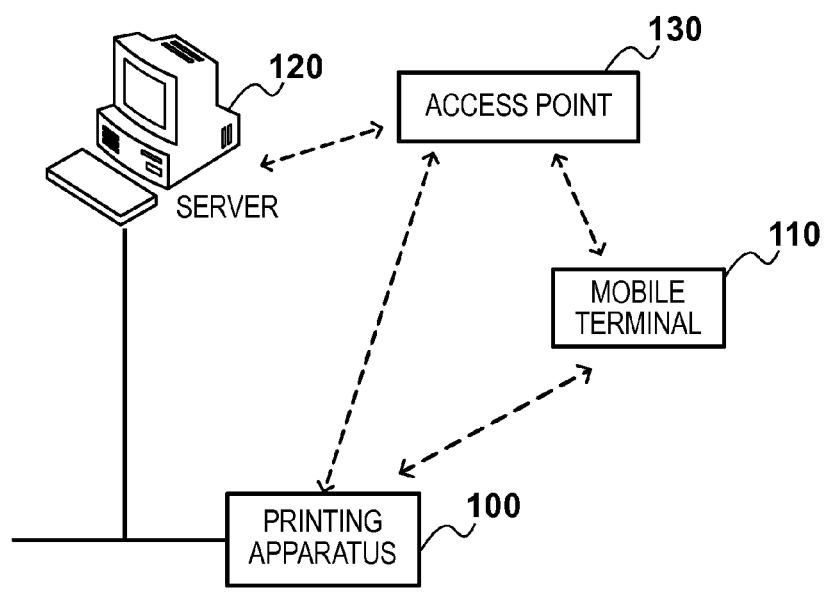

F I G. 16A
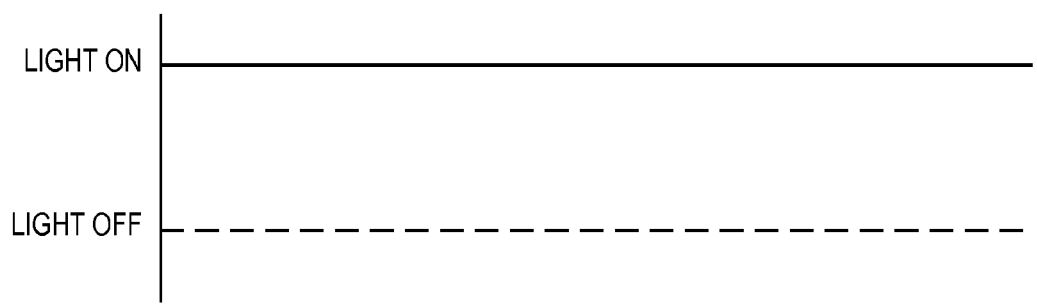
F I G. 16B
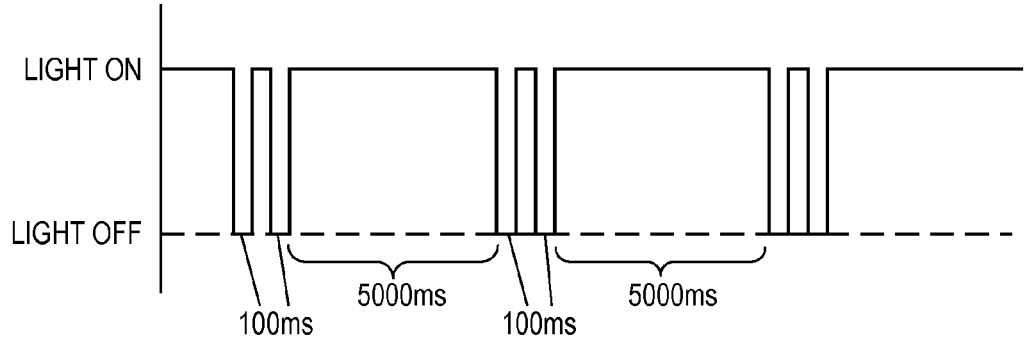

APPARATUS AND METHOD FOR PERFORMING WIRELESS COMMUNICATION WITH A TERMINAL SWITCHING BETWEEN COMMUNICATION MODES

BACKGROUND OF THE INVENTION

1. Field of the Invention

The present invention relates to a communication apparatus, a method of controlling the same, and a storage medium.

2. Description of the Related Art

In recent years, printing apparatuses, such as multi function peripherals and printers, having a wireless LAN function are increasing. It is common for printing apparatuses having wireless LAN to be provided with a function for connecting wirelessly to an access point as a client. Meanwhile, PCs and mobile terminals are being used for device management in which they communicate with a printing apparatus via an access point, causing the printing apparatus to print desired data by transmitting it, and receiving device information from the printing apparatus.

Meanwhile, in recent years, Wi-Fi Direct (registered trademark) (hereinafter referred to as Wi-Fi Direct) has been established by The Wi-Fi Alliance With Wi-Fi Direct a protocol is defined in which it is determined whether wireless terminals will operate as an access point or as a client. By executing this protocol, it can be automatically decided which wireless terminal will be an access point, and which will be a client. By using Wi-Fi Direct, it becomes unnecessary to prepare an access point separately, and various application services (image sharing, printing, etc.) are executable by direct communication between the wireless terminals.

With printing apparatuses in which the above described protocol is executable, configuration may be taken so that a user can instruct from a control panel, or the like, whether to perform wireless communication directly using Wi-Fi Direct, or whether to perform wireless communication indirectly via a third party access point.

However, there are cases in which problems arise when in the middle of receiving print data from a communication terminal such as a PC by a method of indirect wireless communication, for example, instruction is made for switching operation to direct wireless communication using Wi-Fi Direct. In other words, in such a case, when switching processing is executed immediately, a print material for which the user operating the communication terminal instructed printing is cut off forcibly in the process of printing without being printed to the end. In order to avoid this kind of problem, ideas have been proposed (for example, Japanese Patent Laid-Open No. 2012-113349).

In Japanese Patent Laid-Open No. 2012-113349, a printing apparatus having an infrastructure mode for performing wireless communication with a terminal apparatus via an access point, and an adhoc mode for performing wireless communication directly one-to-one between terminal apparatuses without going through an access point is recited. When a switching from the infrastructure mode to the adhoc mode is instructed by a user, determination is made as to whether or not currently print data is being received in the infrastructure mode, the switching not performed in such a case, and the user is notified of such by displaying to a display unit.

However, cases other than when print data is being received in which it is better to not perform the above described mode switching other also exist. Amongst these there exist cases unlike when print data is being received in which it cannot be discriminated immediately whether "now is a timing at which it is better to not perform the switching" for the user. For example, in a case where a printing apparatus is operating in Wi-Fi Direct, multiple mobile terminals can connect simultaneously to the printing apparatus. Accordingly, even in a case where the user of a mobile terminal ends a connection with the printing apparatus by Wi-Fi Direct, there is the possibility that a user of another mobile terminal is still connected to the printing apparatus. Here, when the user that ends the connection switches the printing apparatus to an indirect wireless communication mode rather than Wi-Fi Direct, the user of the other mobile terminal may be disconnected in mid-communication In order to avoid these kinds of situations, it is necessary for the user to check that no other user that is currently connected using Wi-Fi Direct exists by checking a communication status of the printing apparatus before performing the switching operation of switching the printing apparatus mode. This kind of check needs to be performed every time, which is cumbersome for the user.

SUMMARY OF THE INVENTION

An aspect of the present invention is to eliminate the above-mentioned problems with the conventional techniques.

A feature of the present invention is to provide a technique in which allows a user to confirm a switching of the communication mode when the user instructed the switching of the communication mode at an inappropriate timing for switching of the communication mode.

According to an aspect of the present invention, there is provided a communication apparatus operable to perform communication with a communication terminal, the communication apparatus comprising: a first wireless communication unit configured to perform wireless communication with the communication terminal by a first wireless communication mode; a second wireless communication unit configured to perform wireless communication with the communication terminal by a second wireless communication mode in which either the communication apparatus or the communication terminal becomes an access point; a receiving unit configured to receive a switching instruction of communication mode from a user; a mode switching unit configured to perform a switching of the communication mode; a determination unit configured to determine whether or not the switching of the communication mode in accordance with the switching instruction received by the receiving unit is executable; a requesting unit configured to make a request for an additional instruction to a user when the determination unit determines that the switching of the communication mode is not executable; and a control unit configured to control the switching of the communication mode by the mode switching unit in accordance with an additional instruction in response to the request made by the requesting unit.

According to another aspect of the present invention, there is provided a communication apparatus operable to perform communication with a communication terminal, the communication apparatus comprising: a first wireless communication unit configured to perform wireless communication with the communication terminal by a first wireless communication mode; a second wireless communication unit configured to perform wireless communication with the communication terminal by a second wireless communication mode in which either the communication apparatus or the communication terminal becomes an access point; a determination unit configured to determine whether or not switching of the communication mode is executable; a receiving unit configured to receive a switching instruction of communication mode from a user; a restriction unit configured to restrict a receipt of a switching instruction of the communication mode by the receiving unit when the determination unit determines that the switching of the communication mode is not executable; and a mode switching unit configured to perform the switching of the communication mode in accordance with the switching instruction received by the receiving unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1A is a view for explaining a Wi-Fi Direct processing sequence.

FIG. 1B is a view for showing a configuration of a communication system according to embodiments.

FIG. 16A is a view for explaining an LED lighting pattern according to a fifth embodiment.

FIG. 16B is a view for explaining an LED lighting pattern according to the fifth embodiment.

DESCRIPTION OF THE EMBODIMENTS

Embodiments of the present invention will be described hereinafter in detail, with reference to the accompanying drawings. It is to be understood that the following embodiments are not intended to limit the scope of the claims of the present invention, and that not all of the combinations of the aspects that are described according to the following embodiments are necessarily required with respect to the means to solve the problems according to the present invention.

FIG. 1A is a view for explaining a Wi-Fi Direct processing sequence.

Here, both a printing apparatus 100 and a mobile terminal 110 support Wi-Fi Direct.

The printing apparatus 100 and the mobile terminal 110 firstly, in step S101, search to determine whether or not any other communication terminal trying to make a wireless connection by Wi-Fi Direct in their surroundings exists, and they find each other. When they find each other, they determine, in step S102, which will become the access point (GroupOwner), and which will become the client (Client). Here, the result of the role deciding is that the printing apparatus 100 will be the access point and the mobile terminal 110 will be the client.

Next, in step S103, using WPS (Wi-Fi Protected Setup), parameters for wireless connection to the mobile terminal 110 which is the client are provided from the printing apparatus 100 which is the access point. Then, in step S104, using these parameters, a wireless connection is made between the printing apparatus 100 and the mobile terminal 110. When the wireless connection is established in this way, addressing is performed, in step S105, for IP communication between the printing apparatus 100 and the mobile terminal 110. Here, the printing apparatus 100, which is the access point, performs the role of a DHCP server, and grants a predetermined IP address to the mobile terminal 110, which is the client.

The above is the basic sequence of Wi-Fi Direct. By executing this sequence, direct wireless communication between an application service loaded in the printing apparatus 100, and an application service loaded in the mobile terminal 110 is possible.

FIG. 1B is a view for showing a configuration of the communication system according to embodiments.

Here, the printing apparatus 100 and the mobile terminal 110 communicate by Wi-Fi Direct, and the printing apparatus 100 and a server 120 communicate via a network by wire or communicate wirelessly via an access point 130 in an infrastructure mode. Note, in FIG. 1B, an embodiment in which there is a connection by wire is not shown.

Figure 2:
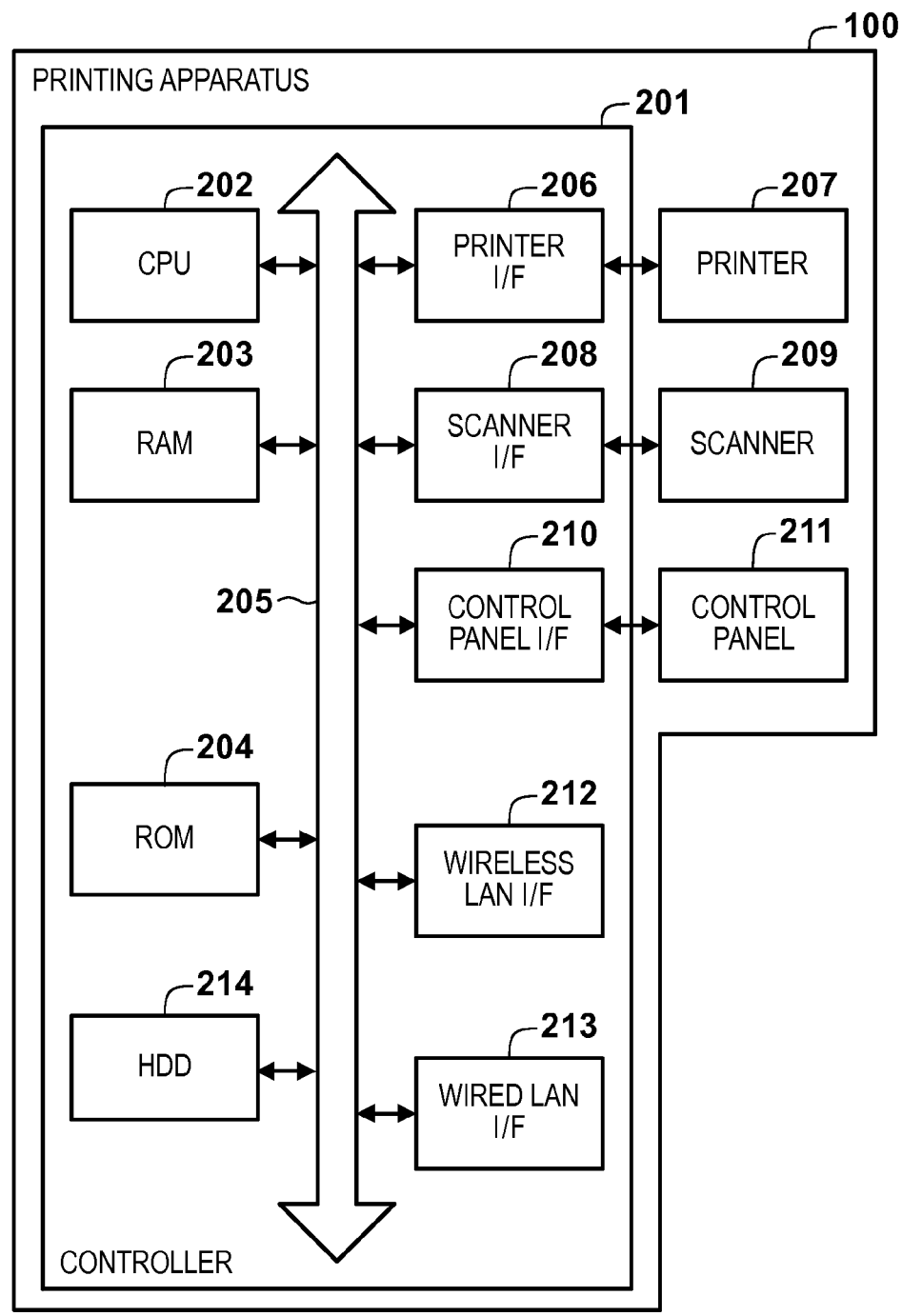
FIG. 2 is a block diagram for showing a hardware configuration of a printing apparatus according to embodiments of the present invention.

FIG. 2 is a block diagram for showing a hardware configuration of the printing apparatus 100 according to embodiments of the present invention.

A controller 201 including a CPU 202 controls operation of the printing apparatus 100 in general. The CPU 202 loads control programs stored in a ROM 204 or an HDD 214 into a RAM 203, and performs various control such as communication control by executing the programs. The RAM 203 is a main memory of the controller 201, and is used as a work area. The HDD 214 stores data, various programs, or various information tables. A printer I/F 206 is an interface for outputting image signals to a printer 207 (a printer engine). Also, a scanner I/F 208, is an interface that inputs image signals obtained by reading an original with a scanner 209 (a scanner engine). Upon a copy operation, the CPU 202 processes image signals input by the scanner I/F 208, and prints with the printer 207 by outputting them to the printer I/F 206 as recording image signals. A control panel I/F 210 connects a control panel 211 and the controller 201. The control panel 211 is provided with a display unit having a touch panel function, a keyboard or the like. The configuration of the control panel 211 will be explained later with reference to FIG. 4A.

A wireless LAN I/F 212 transmits information to external terminals such as the mobile terminal 110 wirelessly, or receives various information from external apparatuses. A wired LAN I/F 213 transmits information by a wired LAN (Ethernet (registered trademark)) to external terminals (not shown), or receives various information from external apparatuses. Each of the blocks in the controller 201 is connected to each other by a system bus 205.

Figure 3:
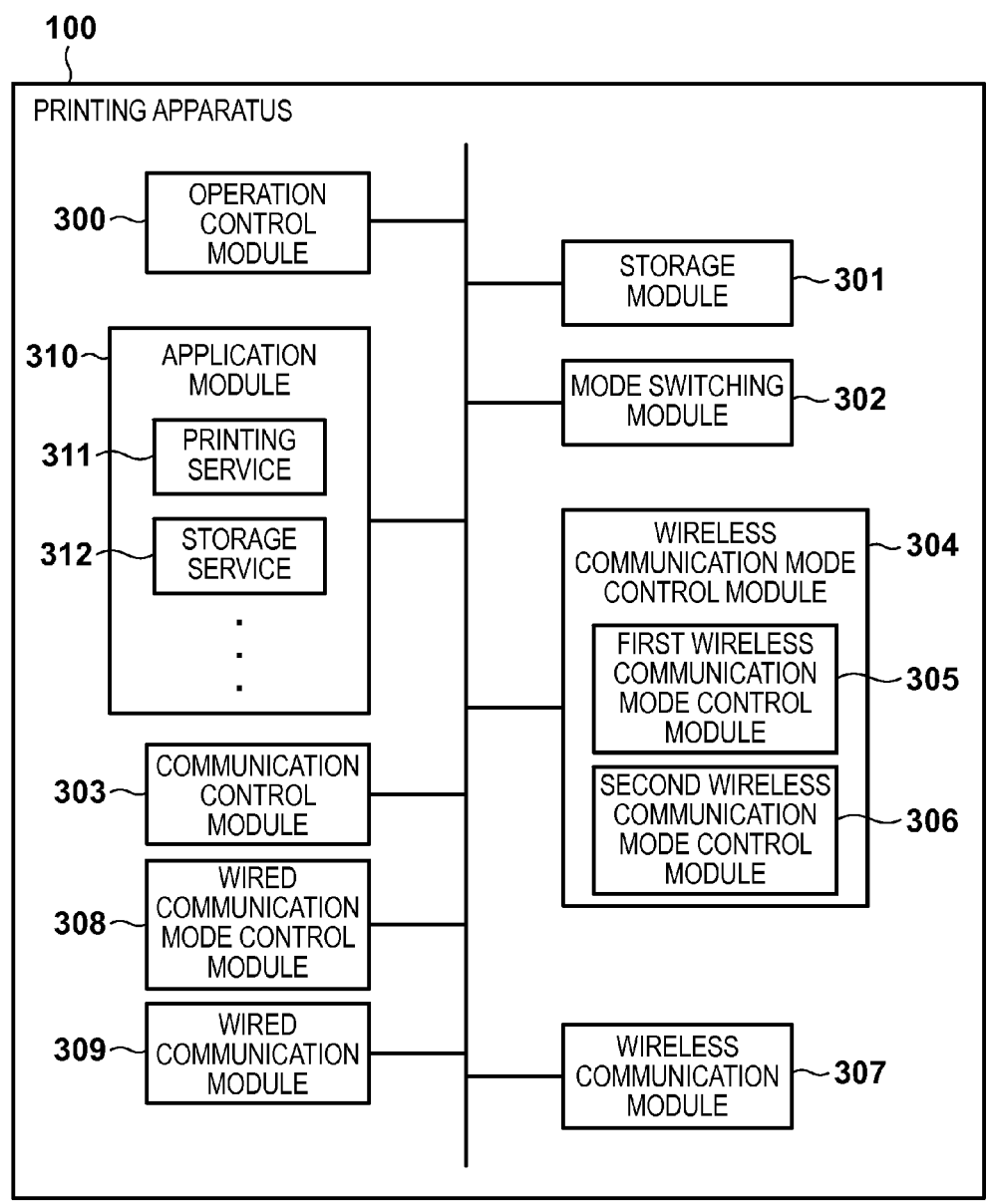
FIG. 3 is a functional block diagram for explaining a software configuration of the printing apparatus according to embodiments.

FIG. 3 is a functional block diagram for explaining a software configuration of the printing apparatus 100 according to embodiments. Each functional unit shown in FIG. 3 is realized by the CPU 202 of the printing apparatus 100 executing a control program loaded from the ROM 204 or the HDD 214 into the RAM 203.

An operation control module 300 controls the control panel 211. The operation control module 300 displays an operation menu on the control panel 211, waits for instruction input from a user, notifies other functional units of the content of instructions received by the control panel 211, and displays on the control panel 211 the instruction results. A storage module 301 stores identified data into the RAM 203 or the HDD 214 upon an instruction from another functional unit, or reads out data stored in the RAM 203 or the HDD 214.

A mode switching module 302 performs processing for switching of a communication mode of the printing apparatus 100. For communication modes, there exists a mode for performing communication by the wired LAN (wired mode), and a mode for performing communication by wireless LAN (wireless communication mode). In the wireless communication mode, there further exists a first wireless communication mode and a second wireless communication mode. The first wireless communication mode is a mode for performing wireless communication via the access point 130 when the printing apparatus 100 performs wireless communication with the server 120 or the mobile terminal 110. The second wireless communication mode is, for example, a mode for the printing apparatus 100 and the mobile terminal 110 directly performing wireless communication using the Wi-Fi Direct function. In the second wireless communication mode, when the printing apparatus 100 communicates with the mobile terminal 110, either one of the printing apparatus 100 and the mobile terminal 110 makes a wireless connection as the access point, and the other as the client, and they perform direct communication.

The communication control module 303 performs communication control when the printing apparatus 100 communicates with an external apparatus such as the mobile terminal 110. Specifically, transmission data is sent out from the application module 310 over a network by passing it to a wireless communication module 307 or a wired communication module 309. Also, received data which is received via the wireless communication module 307 or the wired communication module 309 is passed to the application module 310.

A wireless communication mode control module 304 controls the wireless communication mode. The wireless communication mode control module 304 further includes a first wireless communication mode control module 305 and a second wireless communication mode control module 306. The first wireless communication mode control module 305 performs communication control when the printing apparatus 100 operates in the first wireless communication mode. The second wireless communication mode control module 306 performs communication control when the printing apparatus 100 operates in the second wireless communication mode (Wi-Fi Direct). The wireless communication module 307 controls the wireless LAN I/F 212 and, in a case where the printing apparatus 100 is operating in the wireless communication mode, performs data transmission and receiving when the application module 310 performing communication with an external apparatus such as the mobile terminal 110.

A wired communication mode control module 308 performs communication control in the wired mode. The wired communication module 309 controls the wired LAN I/F 213 and performs data transmission and receiving when the application module 310 performs communication with an external apparatus in a case where the printing apparatus 100 is operating in the wired mode.

The application module 310 includes various services such as a printing service 311 and a storage service 312. The printing service 311 receives, via the communication control module 303, the print data received from the wireless communication module 307 or the wired communication module 309, and outputs the print data to the printer 207 via the printer I/F 206. The storage service 312 receives, via the communication control module 303, the data received from the wireless communication module 307 or the wired communication module 309, and stores this data in a memory such as the HDD 214.

Note, in order to simultaneously operate two or more modes out of the wired mode and the first wireless communication mode and the second wireless communication mode, it is necessary for the application module 310 and the communication control module 303 to support simultaneous operation of multiple modes. However, there exist printing apparatuses for which the application module 310 or the communication control module 303 does not support simultaneous operation of multiple modes. In this kind of printing apparatus, the wired mode, the first wireless communication mode and the second wireless communication mode may operate exclusively only one mode at a time. In such a case, the user can select, via the control panel 211, which communication mode for the printing apparatus to operate in.

Figure 4A:
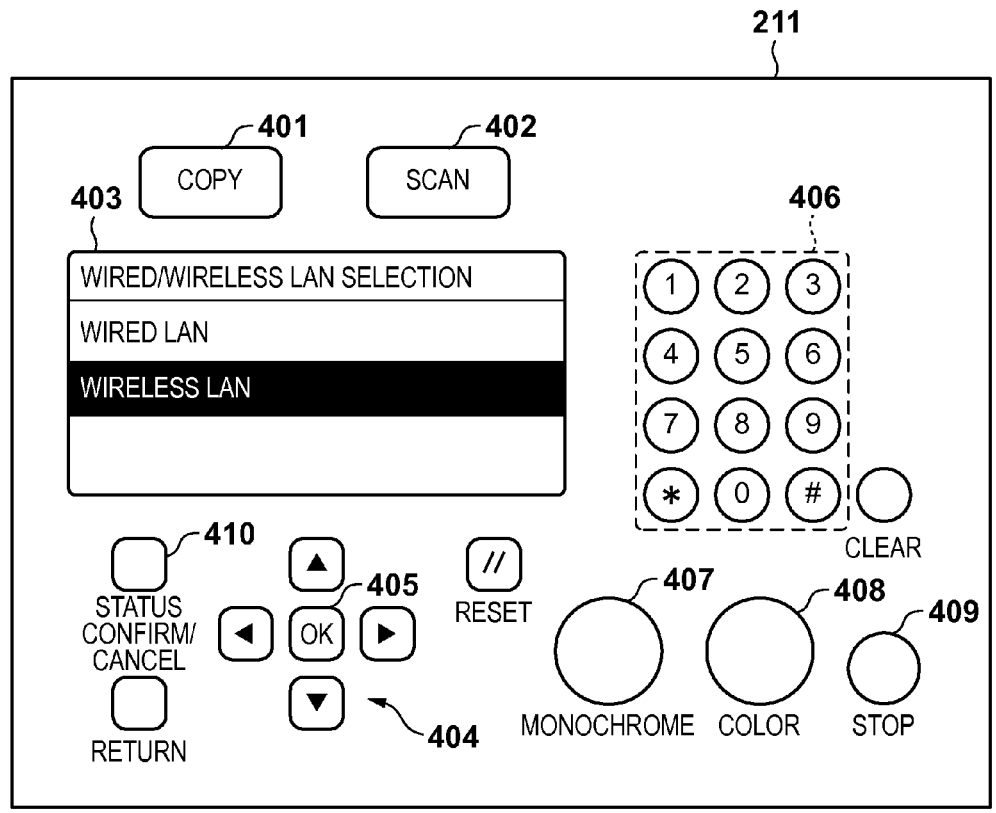
FIG. 4A is a top view of a control panel of a printing apparatus according to embodiments.

FIG. 4A is a top view of the control panel 211 of the printing apparatus 100 according to embodiments.

The printing apparatus 100 according to embodiments has a scanning function with the scanner 209, and a copy function with the printer 207 and the scanner 209. In addition, it has a function for performing printing (print) for which an instruction is received from an external device such as the mobile terminal 110 by the wireless LAN I/F 212 or the wired LAN I/F 213.

Next, explanation will be given for the control panel 211.

In the control panel 211, there is a copy function button 401 and a scanning function button 402 which are keys for selecting the above described functions and the user may press the button for the function he or she wishes to use. Also, in order to notify the user of a setting status or a device status of the printing apparatus 100, the control panel 211 has a display unit 403. Arrow keys 404 are used for movement of a cursor displayed on the display unit 403. There are four-direction buttons for up, down, left and right in the arrow keys 404. In the center of the arrow keys 404, an OK key 405 is arranged, and the OK key 405 has a function as a "deciding key" for setting or queries. For example, in a case where the user wishes to change a copy setting (paper size), when the copy function button 401 is pressed, a copy function screen is entered, the item that the user wishes to change (paper size) is selected with the arrow keys 404, and the OK key 405 is pressed, transition is made to a selectable setting screen. The user can confirm the setting by moving the cursor to the position of the desired setting by operating the arrow keys 404 on the setting screen, and pressing the OK key 405. For numeric value input such as a number of copies, the user uses a numeric keypad 406.

There is a black and white start key 407 and a color start key 408 as keys for instructing a start of a copy or a scan. In this embodiment, a color copy function is envisioned, and there is a color start key 408. However, for printing apparatuses having only a monochrome scanning function or a monochrome print function, the black and white start key 407 may be the only start key. Furthermore, in printing apparatuses having a function by which it is possible to distinguish between a color original and a monochrome original when an original is scanned, there need not be limitation to the start keys shown in the figure. A stop key 409 is a key for making an instruction for stopping the operation of various functions. Meanwhile, one way of stopping operation is that the user can stop processing by operating a status confirmation/cancel key 410, displaying a status confirmation screen for processing being performed on the printing apparatus 100, and selecting the processing the user wishes to abort on the status confirmation screen. In this case, the previously described arrow keys 404 and the OK key 405 are used for selection/deciding.

Note, in the display unit 403 of FIG. 4A, an example is shown of a state in which menu items for switching between the wired mode and the wireless communication mode are displayed as the result of the user operating the arrow keys 404 and the OK key 405 and transitioning through the menu hierarchy. The two selection menu items "wired LAN" and "wireless LAN" are displayed for the menu item "wired/wireless LAN selection". Here, when the user the moves the cursor to "wired LAN" and presses the OK key 405, the printing apparatus 100 initiates operation in the wired mode.

Meanwhile, as illustrated in FIG. 4A, the user presses the OK key 405 in a state in which the user moved the cursor to "wireless LAN" by operating the arrow keys 404. With this, the printing apparatus 100 initiates the operation in the wireless communication mode, and also a "wireless LAN settings" menu is displayed on the display unit 403 as shown in FIG. 4B.

Figure 4B:
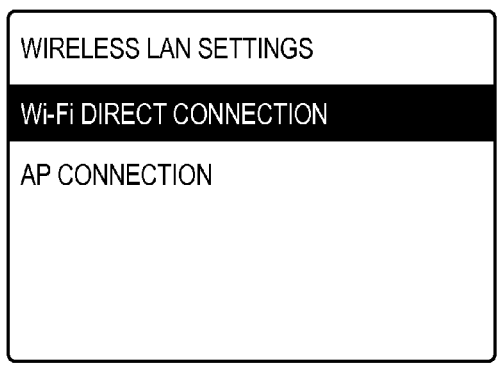
FIG. 4B is a view for illustrating a "wireless LAN settings" menu.

In the "wireless LAN settings" menu shown in FIG. 4B, selection menu items "Wi-Fi Direct connection", and "AP connection" are displayed. Here, when the user, as illustrated in FIG. 4B, moves the cursor to "Wi-Fi Direct connection" and presses the OK key 405, the printing apparatus 100 initiates communication operation in the second wireless communication mode. Also, when the user presses the OK key 405 in a state in which the cursor is moved to "AP connection", the printing apparatus 100 initiates communication operation in the first wireless communication mode.

[First Embodiment]

Figure 5:
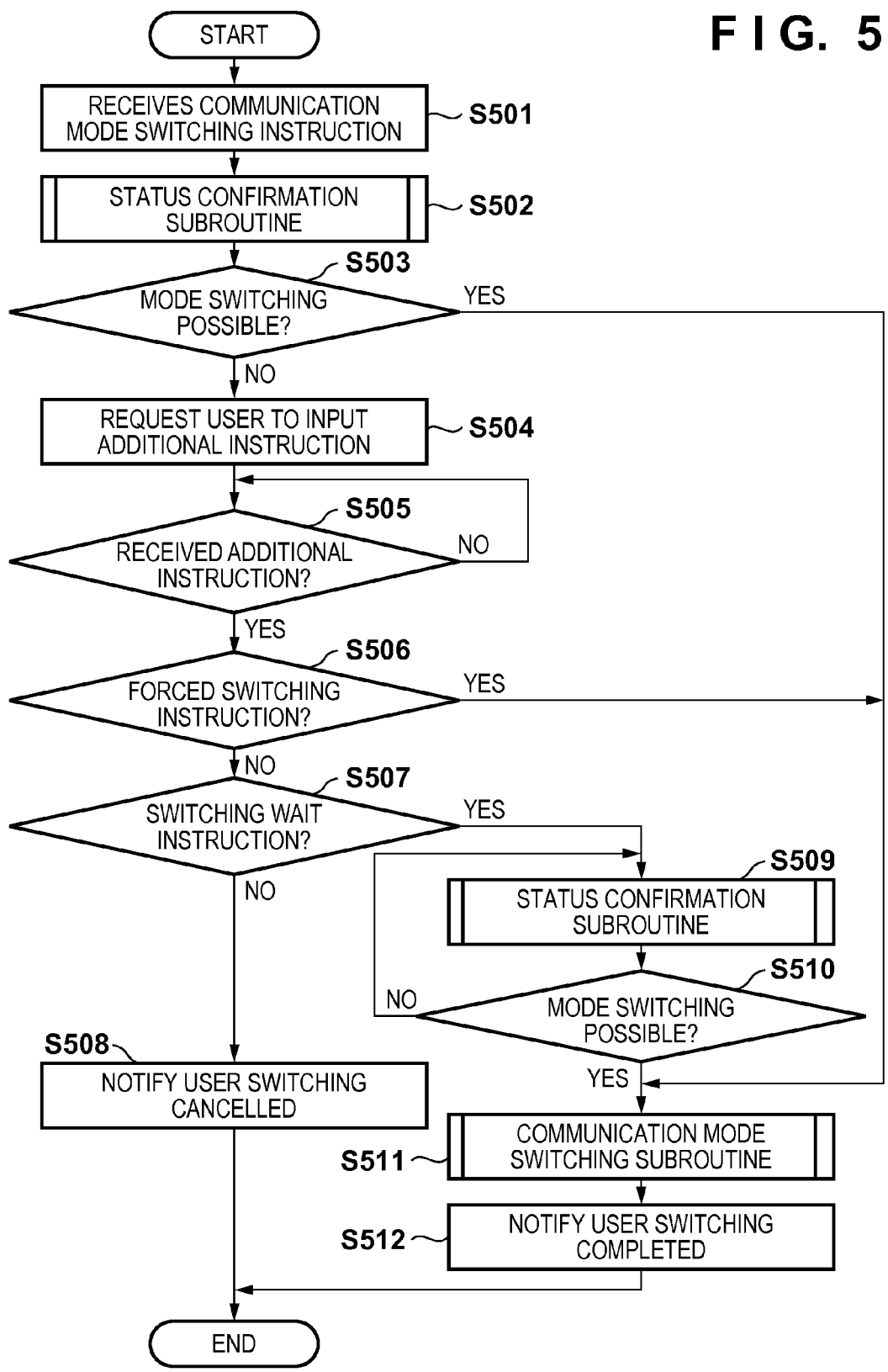
FIG. 5 is a flowchart for describing communication mode switching processing in the printing apparatus according to a first embodiment.

FIG. 5 is a flowchart for describing communication mode switching processing in the printing apparatus 100 according to a first embodiment. In the figure, processing steps S501-S512 are shown. This processing is realized by a program by which the CPU 202 executes the control procedure corresponding to these steps being loaded into the RAM 203 of the controller 201 upon execution, and the CPU 202 executing the program.

Firstly, in step S501, the CPU 202 receives a communication mode switching instruction from the operation control module 300 that the user made on a screen of the control panel 211 of FIG. 4A, for example. This processing corresponds to processing of the mode switching module 302. Next, the processing proceeds to step S502, and the CPU 202 executes a status confirmation subroutine to confirm the current communication status of the printing apparatus 100. Details of the status confirmation subroutine, will be explained later with reference to the flowchart of FIG. 6.

Next, the processing proceeds to step S503, and the CPU 202 determines whether or not the printing apparatus 100 is in a state in which switching of the communication mode is executable based on the result of the status confirmation subroutine of step S502. Here, the CPU 202 moves the processing to step S511 in a case where the switching of the communication mode is determined to be possible, and executes a subroutine for communication mode switching. Details of the communication mode switching subroutine will be explained later with reference to FIG. 7. When the switching of the communication mode completes in step S511, the processing proceeds to step S512, the CPU 202 displays that the switching of the communication mode completed on the display unit 403 via the operation control module 300, and the processing completes.

On the other hand, in a case where the CPU 202 determines that the switching of the communication mode is not possible in step S503, the processing proceeds to step S504, and the CPU 202 displays a screen requesting the user to input an additional instruction to the display unit 403 via the operation control module 300. The CPU 202, in step S505, waits on the receipt of an additional instruction of the user via the operation control module 300.

Figure 8A:
FIG. 8A is a view for showing an example of an input screen for an additional instruction displayed to a display unit of the printing apparatus according to the first embodiment.

FIG. 8A is a view for illustrating an example of an input screen for an additional instruction displayed on the display unit 403 of the printing apparatus 100 according to the first embodiment.

This input screen is a screen for notifying the user that instructed the switching of the communication mode of the possibility that another user currently communicating exists, and for confirming whether to continue with the switching operation anyway. It is necessary for the user to select one of "immediately perform switching" 801, "wait for communication completion for switching" 802, and "do not perform switching" 803. When the user selects one of the selection menu items and presses an OK key 405 on the screen, the information is transferred to the mode switching module 302 via the operation control module 300. With this, the processing proceeds from step S505 to step S506.

In step S506, the CPU 202 determines whether or not "immediately perform switching" 801 was selected. In a case where "immediately perform switching" 801 was selected, the CPU 202 moves the processing to step S511, and executes a mode switching subroutine. Then, the CPU 202 displays (step S512) to the display unit 403 via the operation control module 300 that the mode switching completed, and completes the processing.

On the other hand, when the CPU 202 determines, in step S506, that "immediately perform switching" 801 is not selected, it moves the processing to step S507, and determines whether or not "wait for communication completion for switching" 802 is selected. In a case where "wait for communication completion for switching" 802 is selected, the processing proceeds to step S509, and the CPU 202 re-executes the status confirmation subroutine, and confirms the current communication status of the printing apparatus 100. Note, here the executed status confirmation subroutine has the same content as that executed in step S502. Then, the processing proceeds to step S510, the CPU 202 determines whether or not the printing apparatus 100 is in a state in which mode switching is possible, and in a case where the state is such that the switching of the communication mode is not possible, the processing returns to step S509, and thereafter the CPU 202 waits until a state in which switching of the communication mode is possible is entered. When, in this way, it is determined that a state in which switching of the communication mode is possible is entered, the processing proceeds to step S511, and the mode switching subroutine is executed. The, as previously explained, the CPU 202 displays, in step S512, to the display unit 403 via the operation control module 300 that the switching of the communication mode completed, and completes the processing.

On the other hand, when, in step S505, the user selected "do not perform switching" 803, the processing proceeds to step S508 from step S507, and the CPU 202 does not perform the switching of the communication mode. Then, the CPU 202 displays that the switching of the communication mode was cancelled to the display unit 403 via the operation control module 300, and the processing completes.

Figure 6:
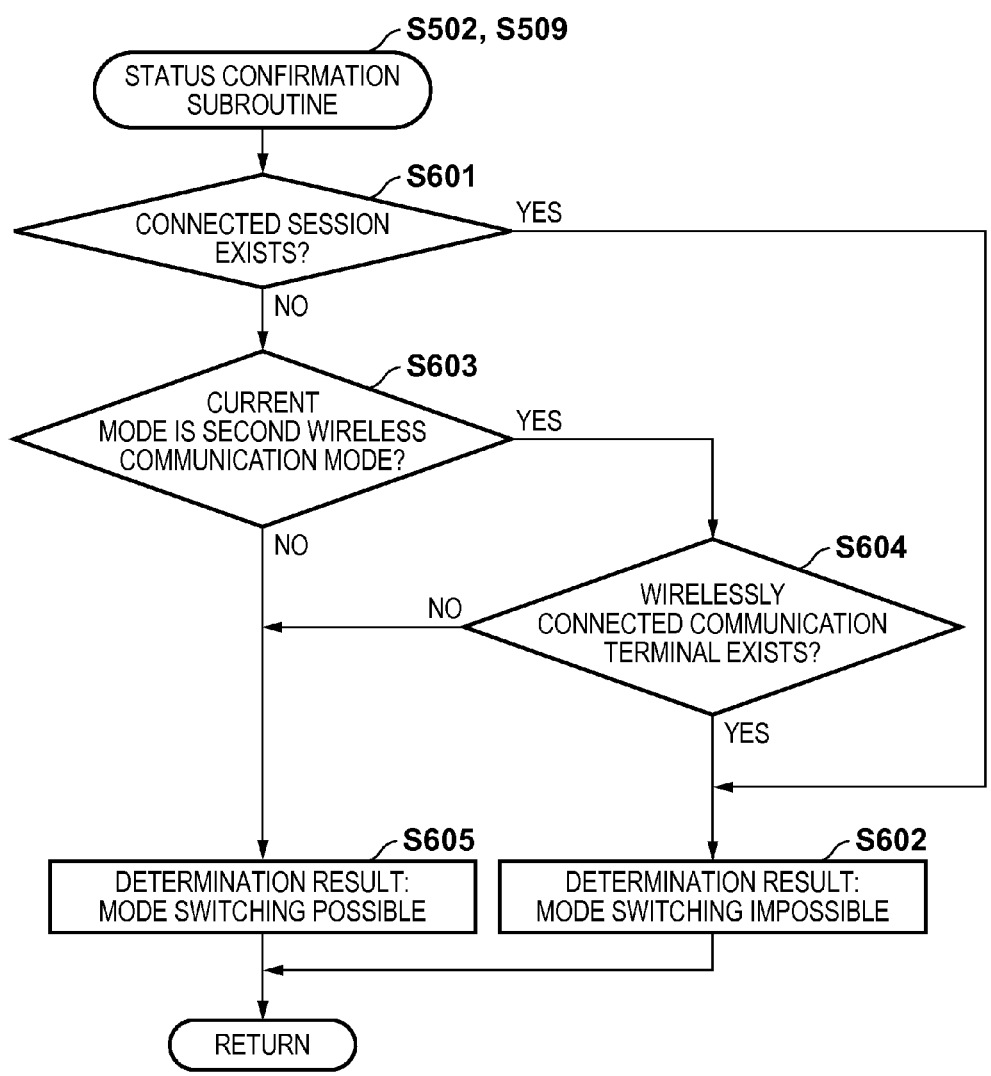
FIG. 6 is a flowchart for describing a status confirmation subroutine shown in step S502 and step S509 of FIG. 5.

FIG. 6 is a flowchart for describing a status confirmation subroutine shown in step S502 and step S509 of FIG. 5.

Firstly, in step S601, the CPU 202 determines whether or not there currently exists a service having an established communication session with a communication terminal, such as the mobile terminal 110, out of the services in the application module 310 by querying the communication control module 303. Here, when it is determined that there is a service having an established communication session, the processing proceeds to step S602, the CPU 202 determines that the state is such that the switching of the communication mode is not possible, and the processing of the subroutine completes. Note, in step S602, information indicating the determination result is stored in the RAM 203. With this, in later processing, it can be determined whether or not switching of communication mode is possible by referencing the information stored in the RAM 203.

Meanwhile, in a case where it is determined in step S601 that no service having an established communication session exists, the processing proceeds to step S603, and the CPU 202 determines whether or not the currently valid mode is the second wireless communication mode by acquiring mode information from the storage module 301. In a case where current valid mode is determined not to be the second wireless communication mode, i.e. the mode is the wired mode or the first wireless communication mode, the CPU 202 moves the processing to step S605. In step S605, the CPU 202 determines that the state is such that the switching of the communication mode is possible, and the processing completes. Note, in step S605, similarly to in step S602, information indicating this determination result is stored in the RAM 203, and in later processing, the information stored in the RAM 203 can be referenced.

Meanwhile, in a case where the CPU 202, in step S603, determines that the current valid communication mode is the second wireless communication mode, it moves the processing to step S604. In step S604, the CPU 202 queries the second wireless communication mode control module 306 as to whether or not there exists a communication terminal such as the mobile terminal 110 that is directly wirelessly connected with the printing apparatus 100 in the second wireless communication mode. In a case where the CPU 202, in step S604, determines that a communication terminal that is connected exists, the CPU 202 determines that the state is such that the switching of the communication mode is not possible, and it moves the processing to step S602. In step S602, the CPU 202 determines that the state is such that the switching of the communication mode is not possible, and the processing of the subroutine completes.

Also, when, in step S604, the CPU 202 determines that a communication terminal that is wirelessly connected does not exist, the processing proceeds to step S605, the CPU 202 determines that the state is such that the switching of the communication mode is possible, and the processing of the subroutine completes.

Figure 7:
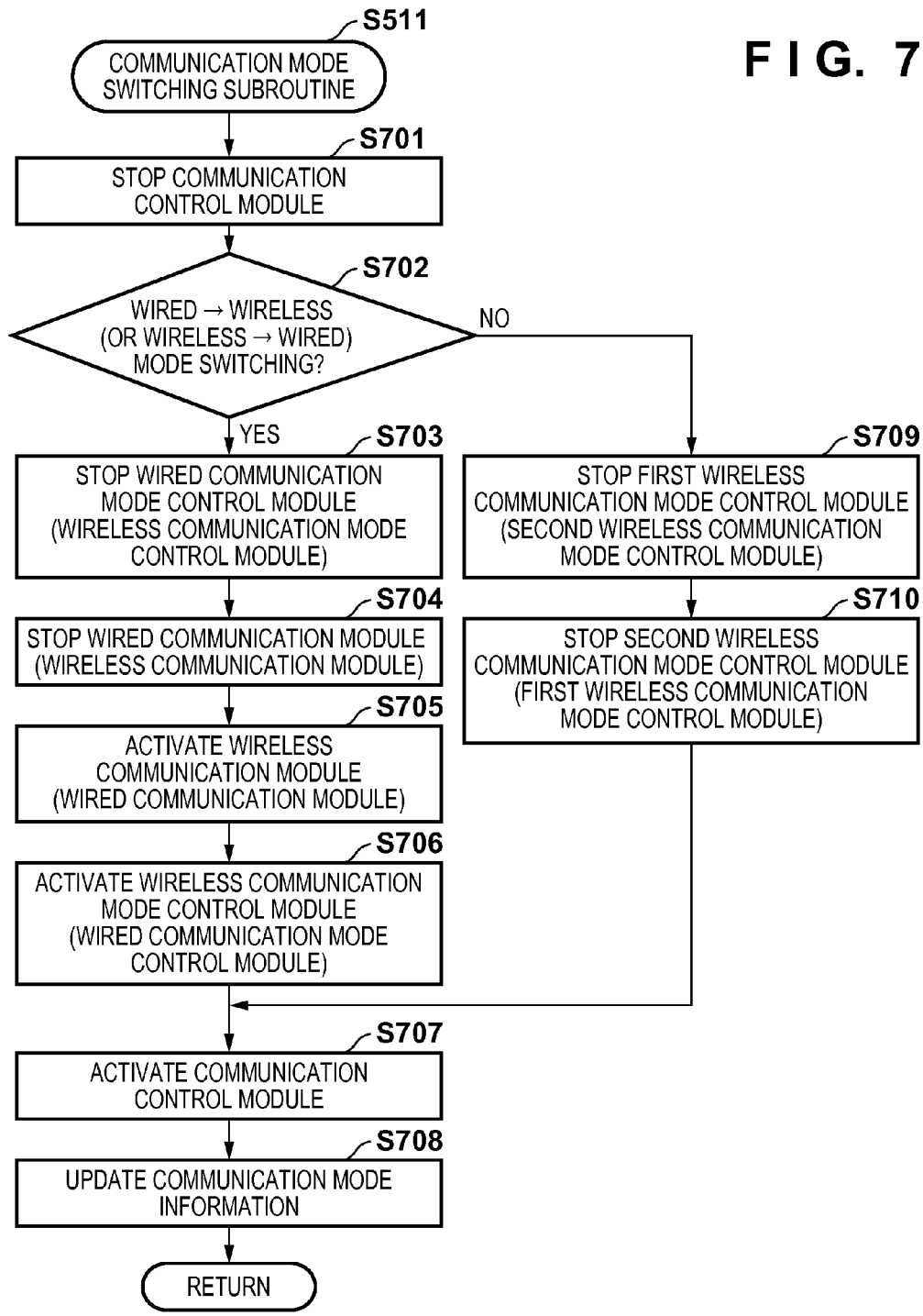
FIG. 7 is a flowchart for describing a communication mode switching subroutine shown in step S511 of FIG. 5.

FIG. 7 is a flowchart for describing the mode switching subroutine of step S511 of FIG. 5.

Firstly, in step S701, the CPU 202 stops the communication control module 303. With this, a state is entered in which the services of the application module 310 cannot communicate with communication terminals such as the mobile terminal 110. Next the processing proceeds to step S702, and the CPU 202 acquires communication mode information from the storage module 301, and determines if the request is for transition from some communication mode and to some other communication mode. Here, in a case of switching from a wired communication mode to a wireless communication mode (or from a wireless communication mode to a wired communication mode), the processing proceeds to step S703, and operation of the wired communication mode control module 308 (or the wireless communication mode control module 304) is stopped. When the wired communication mode control module 308 is stopped, the wired communication module 309 enters a state in which it does not perform wired communication. Also, in a case where the wireless communication mode control module 304 is stopped, the printing apparatus 100 enters a state in which the wireless connection with the access point or the mobile terminal 110 is disconnected, and the wireless communication module 307 enters a state in which it does not perform wireless communication. Then the processing proceeds to step S704, and the CPU 202 stops the wired communication module 309 (or the wireless communication module 307). With this, an electric power supply to the wired LAN I/F 213 (or the wireless LAN I/F 212) is stopped.

Next, the CPU 202 moves the processing to step S705, and activates the wireless communication module 307 (or the wired communication module 309). With this, an electric power supply to the wireless LAN I/F 212 (or the wired LAN I/F 213) is initiated. Next, the processing proceeds to step S706, and the CPU 202 activates the wireless communication mode control module 304 (or the wired communication mode control module 308). In a case where it activates the wireless communication mode control module 304, the wireless communication module 307 enters a state in which wireless communication is possible. With this, in accordance with content of a switching instruction made by the user, the first wireless communication mode control module 305 activates in a case where the first wireless communication mode is selected, and the second wireless communication mode control module 306 activates in a case where the second wireless communication mode is selected. Then, a wireless connection is made with the communication terminal in the activated wireless communication mode. Meanwhile, in a case where the wired communication mode control module 308 is activated, the wired communication module 309 enters a state in which wired communication is possible. Then, the CPU 202 moves the processing step S707, and activates the communication control module 303. With this, a state is entered in which it is possible for the services of the application module 310 to communicate with communication terminals such as the mobile terminal 110 in the new communication mode after the switching. Finally, in step S708, the CPU 202 updates the communication mode information stored in the storage module 301 with the latest information, and the processing of the subroutine completes.

Meanwhile, in a case where, in step S702, the CPU 202 determines that a switching from the first wireless communication mode to the second wireless communication mode (or from the second wireless communication mode to the first wireless communication mode) is to occur, it moves the processing to step S709. In step S709, the CPU 202 stops the first wireless communication mode control module 305 (or the second wireless communication mode control module 306). Here, in a case where the first wireless communication mode control module 305 is stopped, a wireless connection in which the printing apparatus 100 is connected as a client with an access point different from the printing apparatus 100 and the mobile terminal 110 is disconnected. Meanwhile, in a case where the second wireless communication mode control module 306 is stopped, a wireless connection using the second wireless communication mode with the mobile terminal 110 is disconnected. Next, the CPU 202 moves the processing to step S710, and activates the second wireless communication mode control module 306 (or the first wireless communication mode control module 305), and makes a wireless connection with the communication terminal in the selected wireless communication mode. After that the CPU 202 moves the processing to step S707, and activates the communication control module 303. With this, the services of the application module 310 enter a state in which communication with a communication terminal such as the mobile terminal 110 by the new communication mode after the switching is possible. Then, in step S708, the mode information stored in the storage module 301 is updated with the latest information, and the processing of the subroutine completes.

As explained above, by the first embodiment, in a case where the user instructed the switching of the communication mode at a timing at which the communication mode of the printing apparatus 100 should not be switched, the user is notified of such, and it is possible for the user to confirm whether to continue with the switching operation. With this, for the user performing the switching instruction, it becomes unnecessary to check by oneself beforehand whether the printing apparatus 100 is in a state in which switching is possible, and so the operation becomes easy. Furthermore, there is the effect that, for other users, situations in which their own work is suddenly forcibly disconnected can be avoided.

[Second Embodiment]

Next, explanation will be given for a second embodiment according to the present invention. In the mode switching module 302 of the printing apparatus 100 according to the previously described first embodiment, the status confirmation subroutine shown in FIG. 6 is executed at the point in time when a communication mode switching instruction by a user is received from the operation control module 300.

In contrast to this, in the second embodiment, the status confirmation subroutine is executed before the communication mode switching instruction by the user is received from the operation control module 300. In a case where, as the result of the status confirmation, it is determined that the state is such that the switching of the communication mode is not possible, the operation control module 300 is controlled so as not to perform the communication mode switching instruction by the user. Detailed explanation will be given below. Note, because the configuration and system of the printing apparatus 100 according to the second embodiment are similar to that of the previously described first embodiment, explanation is omitted.

Figure 8B:
FIG. 8B is a view for showing an example of a "wired/wireless LAN selection" menu screen.

FIG. 8B is a view for illustrating an example of a "wired/wireless LAN selection" menu screen which is displayed on the display unit 403 of the printing apparatus 100 according to the second embodiment of the present invention.

On the "wired/wireless LAN selection" menu according to the second embodiment, the selection menu items "wired LAN", and "wireless LAN" are displayed similarly to the previously described first embodiment. In the second embodiment, it is assumed that when the "wired/wireless LAN selection" menu is transitioned to, the result of the mode switching module 302 executing the status confirmation subroutine shown in FIG. 6 is that the state is currently such that the switching of the communication mode is not possible. Also, it is assumed that the state is such that the result of the mode switching module 302 acquiring the communication mode information from the storage module 301 is that currently the printing apparatus 100 is operating in the wired mode. Because of this, the mode switching module 302 notifies the operation control module 300 of the status confirmation result, and the operation control module 300 displays the "wireless LAN" menu item of the display unit 403 to be grayed out. In this way, control is performed so that in a state in which the switching of the communication mode is not possible, the user cannot make an instruction for an operation of switching to a wireless mode from the wired mode.

Similarly, in a case where the state is such that the printing apparatus 100 is operating in the wireless communication mode, the "wireless LAN" menu item is displayed in a selectable state, and the "wired LAN" menu item is displayed grayed out.

Figure 8C:
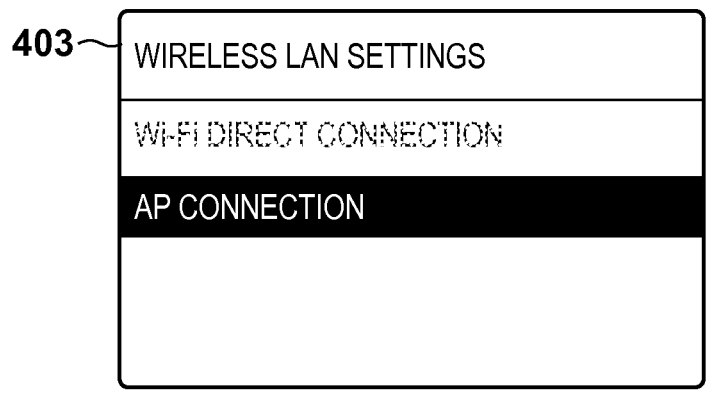
FIG. 8C is a view for showing an example of a "wireless LAN settings" menu screen.

Furthermore, FIG. 8C is a view for illustrating an example of the "wireless LAN settings" menu screen which is displayed on the display unit 403 of the printing apparatus 100 according to a second embodiment of the present invention.

In the "wireless LAN settings" menu according to the second embodiment, selection menu items "Wi-Fi Direct connection" and "AP connection" are displayed similarly to the previously described first embodiment. However, in the second embodiment, it is assumed that when the "wireless LAN settings" menu is transitioned to, the result of the mode switching module 302 executing the status confirmation subroutine shown in FIG. 6 is that currently the state is such that switching of the communication mode is not possible. Also, it is assumed that the result of the mode switching module 302 acquiring the communication mode information from the storage module 301 is that currently the first wireless communication mode is the one that is valid.

In such a case, the mode switching module 302 notifies the operation control module 300 of the status confirmation result, and the operation control module 300 displays "Wi-Fi Direct connection" on the display unit 403 grayed out. With this, because the state is such that communication mode switching is not possible, control is performed so that the user cannot make an instruction for switching from the first wireless communication mode to the second wireless communication mode (Wi-Fi Direct).

Similarly, if the state is such that the printing apparatus 100 is operating in the second wireless communication mode, "Wi-Fi Direct connection" is displayed in a selectable state, and "AP connection" is displayed grayed out.

As explained above, by the second embodiment, when in a state in which communication mode switching is not possible, a communication mode switching instruction by the user is restricted. With this, for other users using the printing apparatus 100, situations in which their own work is suddenly forcibly disconnected can be avoided.

[Third Embodiment]

Next, explanation will be given for a third embodiment according to the present invention. In the third embodiment, in a case where it is determined that the state is such that the switching of the communication mode is not possible in the status confirmation subroutine shown in FIG. 6, during the time period from that point until the switching of the communication mode is executed, direct wireless connection by a new communication session or by the second wireless communication mode may be prohibited. Note, because the configuration and system of the printing apparatus 100 according to the third embodiment are similar to that of the previously described first embodiment, explanation is omitted.

Figure 9:
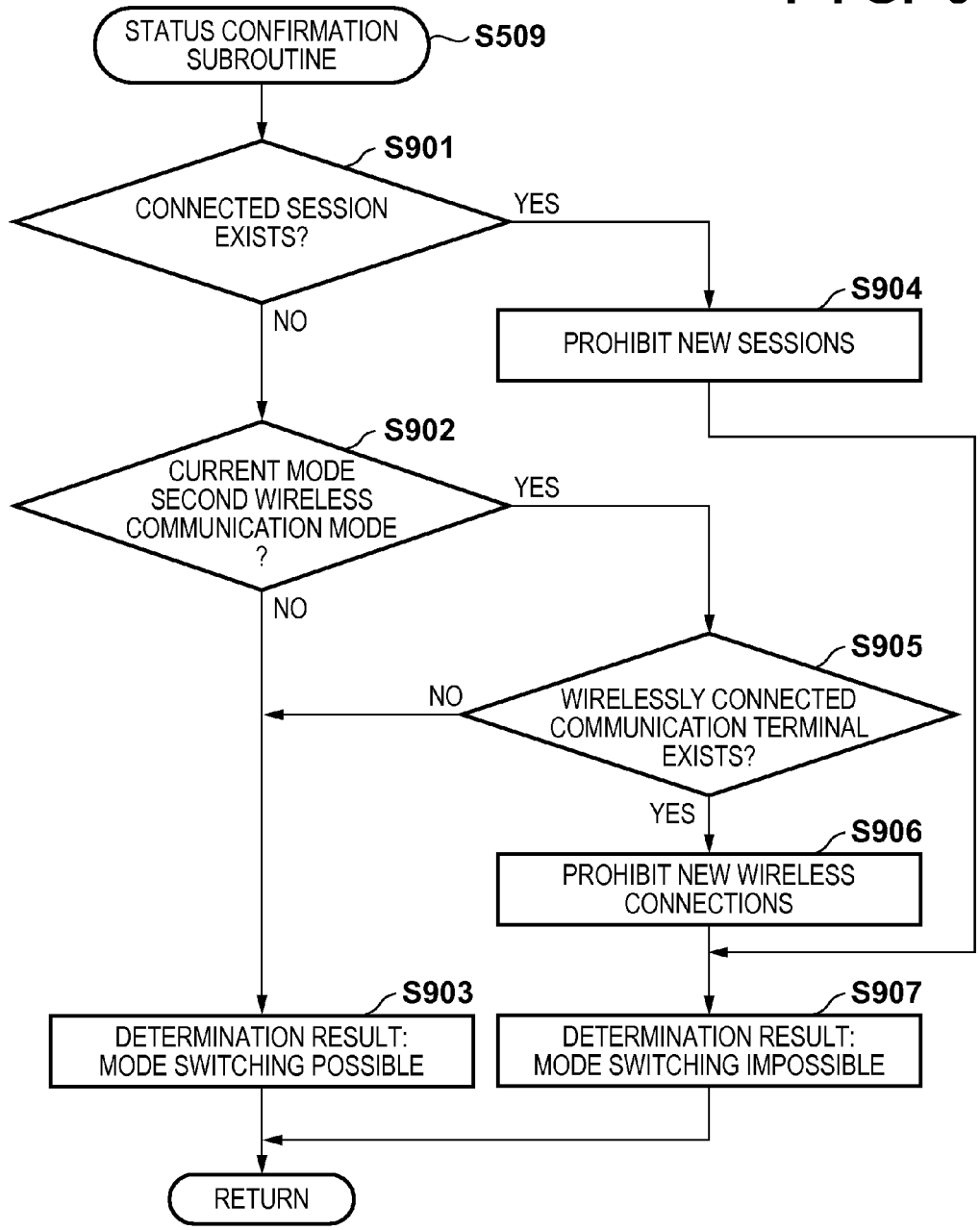
FIG. 9 is a flowchart for describing a status confirmation subroutine according to a third embodiment of the present invention.

FIG. 9 is a flowchart for describing a status confirmation subroutine according to a third embodiment of the present invention. This processing corresponds to the flow of the status confirmation subroutine shown in step S509 of FIG. 5.

In step S901, the CPU 202 queries the communication control module 303 as to whether currently there exists a service for which a communication session with a communication terminal such as the mobile terminal 110 is established out of the services in the application module 310. In a case where such as service does exist, the processing proceeds to step S904 and the CPU 202 makes an instruction to the communication control module 303 prohibiting the generation of a new session for the time period until the communication mode switching processing of the next time completes, and it moves the processing to step S907. In step S907, the CPU 202 determines whether the state is such that the switching of the communication mode is not possible, and the processing of the subroutine completes.

Meanwhile, in a case where, in step S901, the CPU 202 determines that a service for which a communication session is established does not exist, it moves the processing to step S902, acquires communication mode information from the storage module 301, and determines whether or not the currently valid communication mode is the second wireless communication mode. Here, when it is not the second wireless communication mode, i.e. in a case where it is determined that the mode is a wired communication mode or a first wireless communication mode, the processing proceeds to step S903, and the CPU 202 determines that the state is such that the switching of the communication mode is possible, and completes the processing of the subroutine.

Meanwhile, in a case where the CPU 202 determines in step S902 that the currently valid communication mode is the second wireless communication mode, it moves the processing to step S905. In step S905, the CPU 202 queries the second wireless communication mode control module 306 as to whether a communication terminal such as the mobile terminal 110 that is directly wirelessly connected with the printing apparatus 100 in the second wireless communication mode exists. In a case where the CPU 202 determines, in step S905, that a connected communication terminal exists, the processing proceeds to step S906, the CPU 202 makes an instruction to the second wireless communication mode control module 306 prohibiting new wireless connections using the second wireless communication mode with communication terminal thereafter. Then, the processing proceeds to step S907, and the CPU 202 determines that the state is such that the switching of the communication mode is not possible, and the processing completes. Meanwhile, in step S905, in a case where it is determined that a communication terminal that is connected does not exist, the processing proceeds to step S903, it is determined that the state is such that the switching of the communication mode is possible, and the processing of the subroutine completes.

As explained above, by the third embodiment, in a case where it is determined that the state is such that the switching of the communication mode is not possible, during the time period from that point until the switching of the communication mode is executed, new communication sessions and direct wireless connection by the second wireless communication mode are prohibited. With this, new communications and connections occurring in the middle of a wait for initiation of the switching of the communication mode can be avoided, and situations in which the switching of the communication mode cannot be executed can be avoided.

[Fourth Embodiment]

Next, explanation will be given for the fourth embodiment according to the present invention.

As a general use case, the second wireless communication mode is a communication mode used for temporary connections in cases where a user wishes to use the printing apparatus 100 with the mobile terminal 110. In contrast to this, the wired communication mode and the first wireless communication mode are modes used for steady connections such as for cases where the printing apparatus is installed as a single piece of infrastructure in a backbone network in a business, for example. There are cases in which services handling device management in the application module 310 of the printing apparatus 100 operate in a case where the wired communication mode or the first wireless communication mode is connected to the backbone network in a business steadily. These kinds of services detect that various statuses of the printing apparatus 100 change, send notification to a server on a network of the information, or receive a periodic query from a server, and transmit a current status of the printing apparatus 100 in reply.

In such a case, when switching from the wired communication mode or the first wireless communication mode temporarily to the second wireless communication mode is executed, communication with the printing apparatus 100 on the side of a server that is managing/monitoring a status of the printing apparatus 100 cannot be performed albeit temporarily. Because of this, there is the possibility that correct device management by the server cannot be performed. Furthermore, the possibility exists that it is determined by the server that an abnormality occurred on the printing apparatus 100.

In the fourth embodiment according to the present invention, the object is to provide a technique by which to notify a server of a temporary switching of the communication mode. Note, because the configuration and system of the printing apparatus 100 according to the fourth embodiment are similar to that of the previously described first embodiment, explanation is omitted.

Figure 10:
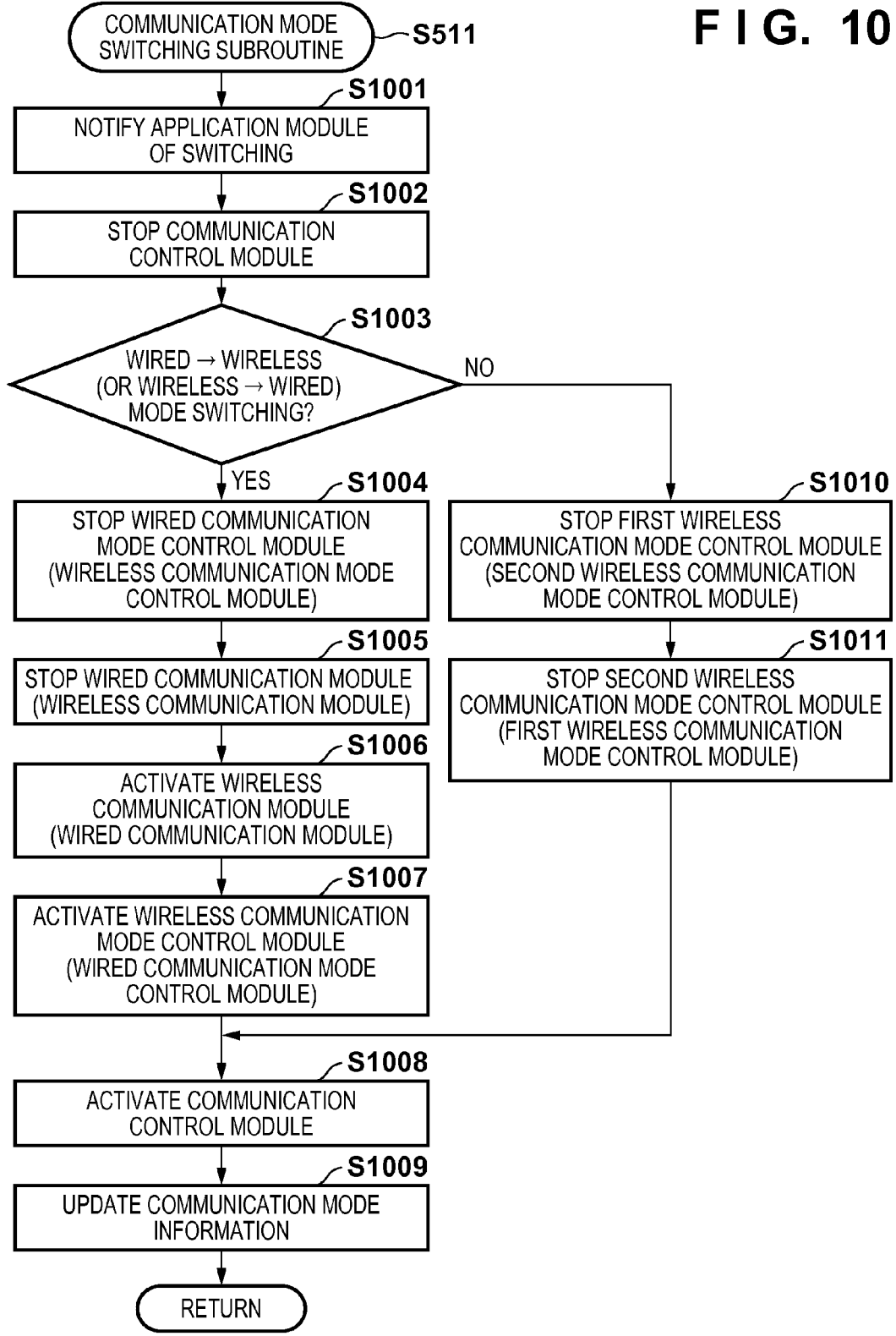
FIG. 10 is a flowchart for describing processing of a communication mode switching subroutine according to a fourth embodiment.

FIG. 10 is a flowchart for describing processing of a communication mode switching subroutine according to a fourth embodiment. This processing corresponds to the processing of the communication mode switching subroutine shown in step S511 of FIG. 5.

Firstly, in step S1001, the CPU 202 makes a notification to the application module 310 of the execution of the mode switching. The services of the application module 310, having received the notification, transmit a notification packet to the server as necessary. Here, the processing of the application module 310 will be explained later with reference to the flowchart of FIG. 11.

After that, the processing proceeds to step S1002, and the CPU 202 stops the operation of the communication control module 303. With this, a state in which the services of the application module 310 cannot communicate with a communication terminal such as the mobile terminal 110 is entered. The processing steps S1003-S1011, which run thereafter, are the same in content as the processing steps S702-S710 of FIG. 7, and so explanation is omitted.

Figure 11:
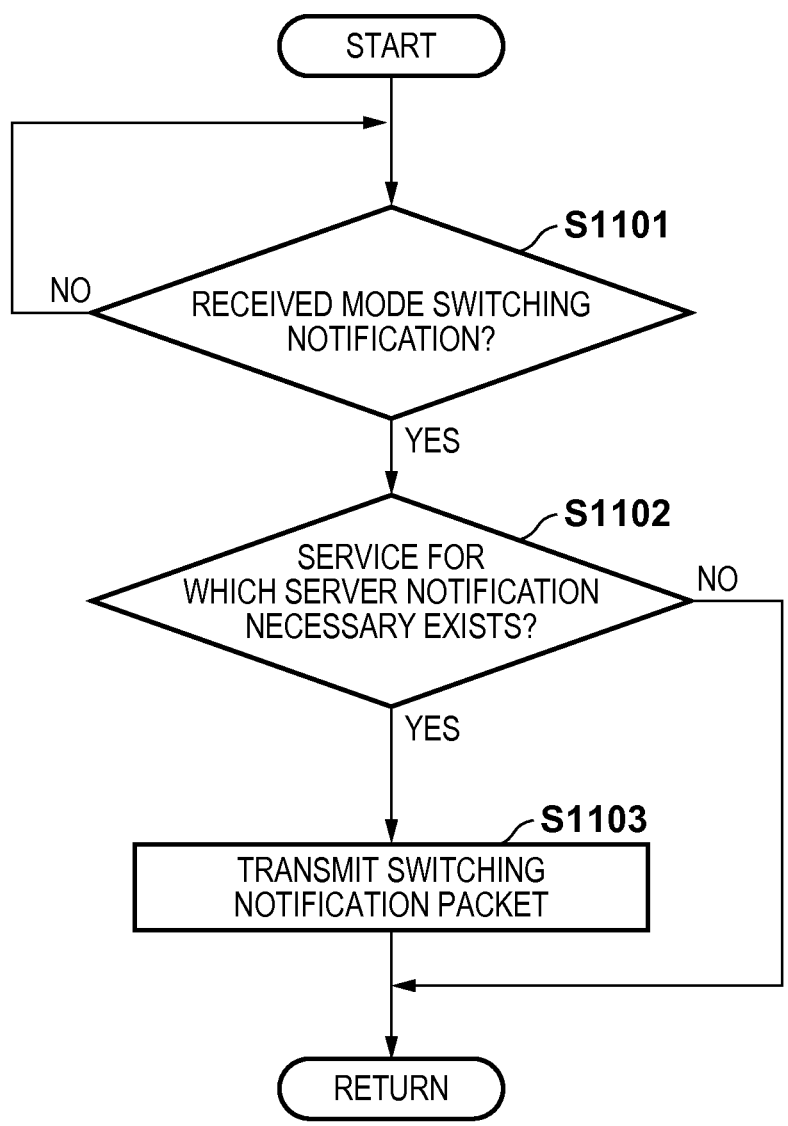
FIG. 11 is a flowchart for describing processing of an application module 310 performed when a communication mode switching execution notification is received from the mode switching unit in step S1001 of FIG. 10.

FIG. 11 is a flowchart for describing processing of the application module 310 performed when a communication mode switching execution notification is received from the mode switching module 302 in step S1001 of FIG. 10.

Step S1101-step S1103 indicate processing steps, and correspond to a flow of processing for transmission of a notification packet for notifying that the application module 310 of the printing apparatus 100 performs communication mode switching. This processing is realized by a program by which the CPU 202 executes the control procedure corresponding to these steps being loaded into the RAM 203 of the controller 201 upon execution and the CPU 202 executing the program.

Firstly, in step S1101, the CPU 202 waits on the receipt of the communication mode switching execution notification from the mode switching module 302. When the communication mode switching execution notification is received, the processing proceeds to step S1102 and the CPU 202 determines whether a service for which a temporary separation notification to an external apparatus such as a server is necessary exists. In a case where this kind of service does not exist, the flowchart completes.

Meanwhile, when it is determined that a service for which notification is necessary exists, the processing proceeds to step S1103, and the CPU 202 transmits to the server a notification packet indicating that there will be a separation because temporarily the switching of the communication mode will be executed for each such service, and the processing completes. This notification packet may be, for example, a deletion request packet for requesting deletion of the registration information related to the printing apparatus 100 which a DNS (Domain Name System) client service transmits to a DNS server. Alternatively, it may be a notification packet for temporary mode switching by SLP (ServiceLocationProtocol). Alternatively, it may be a packet declaring the withdrawal from a group of a multi-cast that a service using a multi-cast address is participating in. Various notification packets by various services may exist other than these.

As explained above, by the fourth embodiment, it becomes possible for the services of the application module 310 to make a notification to a server before the switching of the communication mode is executed. Because of this, it is possible to avoid situations in which correct device management regarding the printing apparatus 100 cannot be performed on the server side, and in which it is erroneously determined that an abnormality occurred on the printing apparatus 100.

[Fifth Embodiment]

Figure 12:
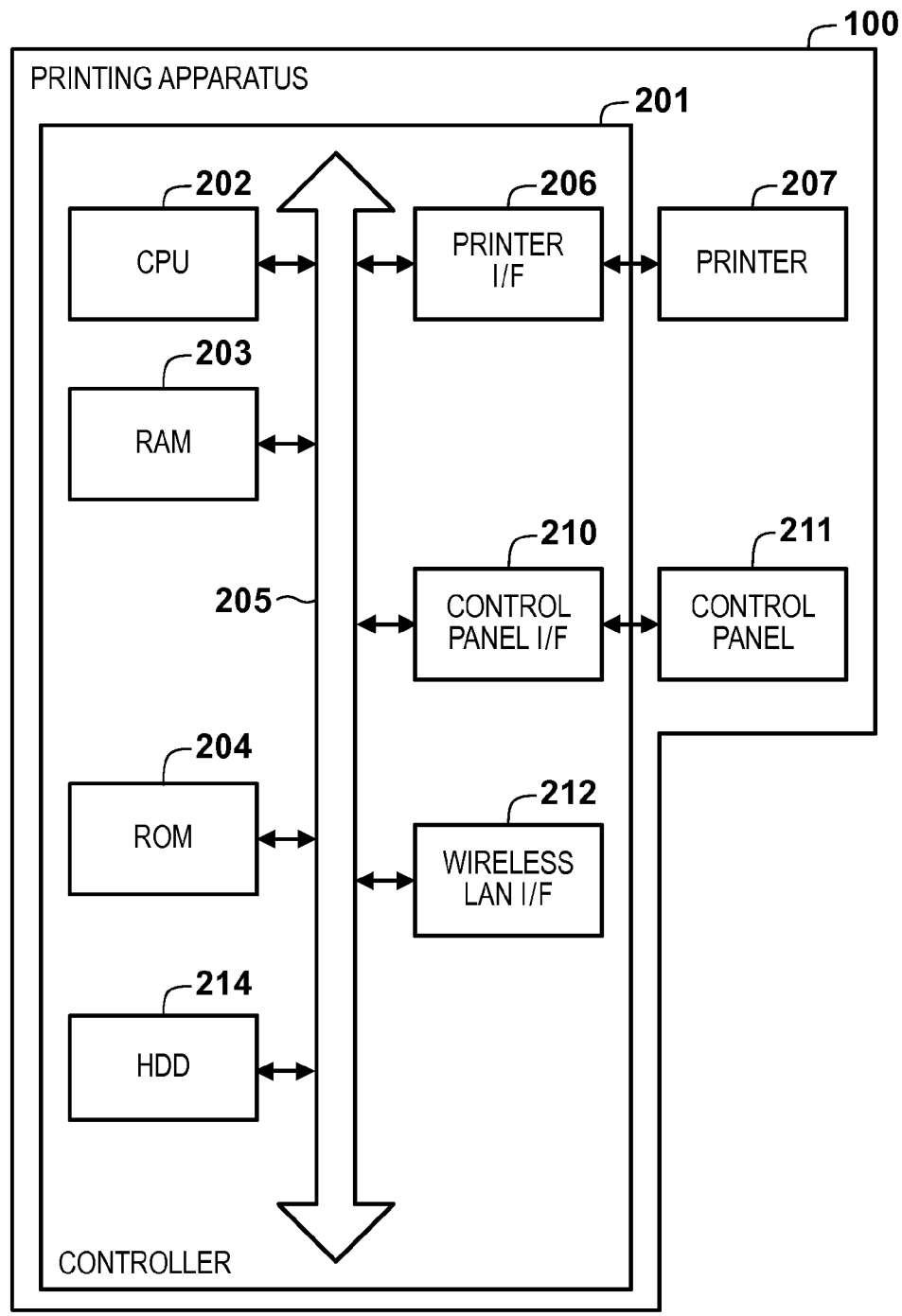
FIG. 12 is a block diagram for showing a hardware configuration of the printing apparatus according to a fifth embodiment.

FIG. 12 is a block diagram for showing a hardware configuration of the printing apparatus 100 according to a fifth embodiment of the present invention.

The printing apparatus 100 according to a fifth embodiment has a configuration in which the scanner I/F 208, the scanner 209, and the wired LAN I/F 213 are removed from the configuration of FIG. 2 according to the previously described first embodiment. Other configuration elements are the same as those explained in the previously described first embodiment, and so explanation is omitted.

Figure 13:
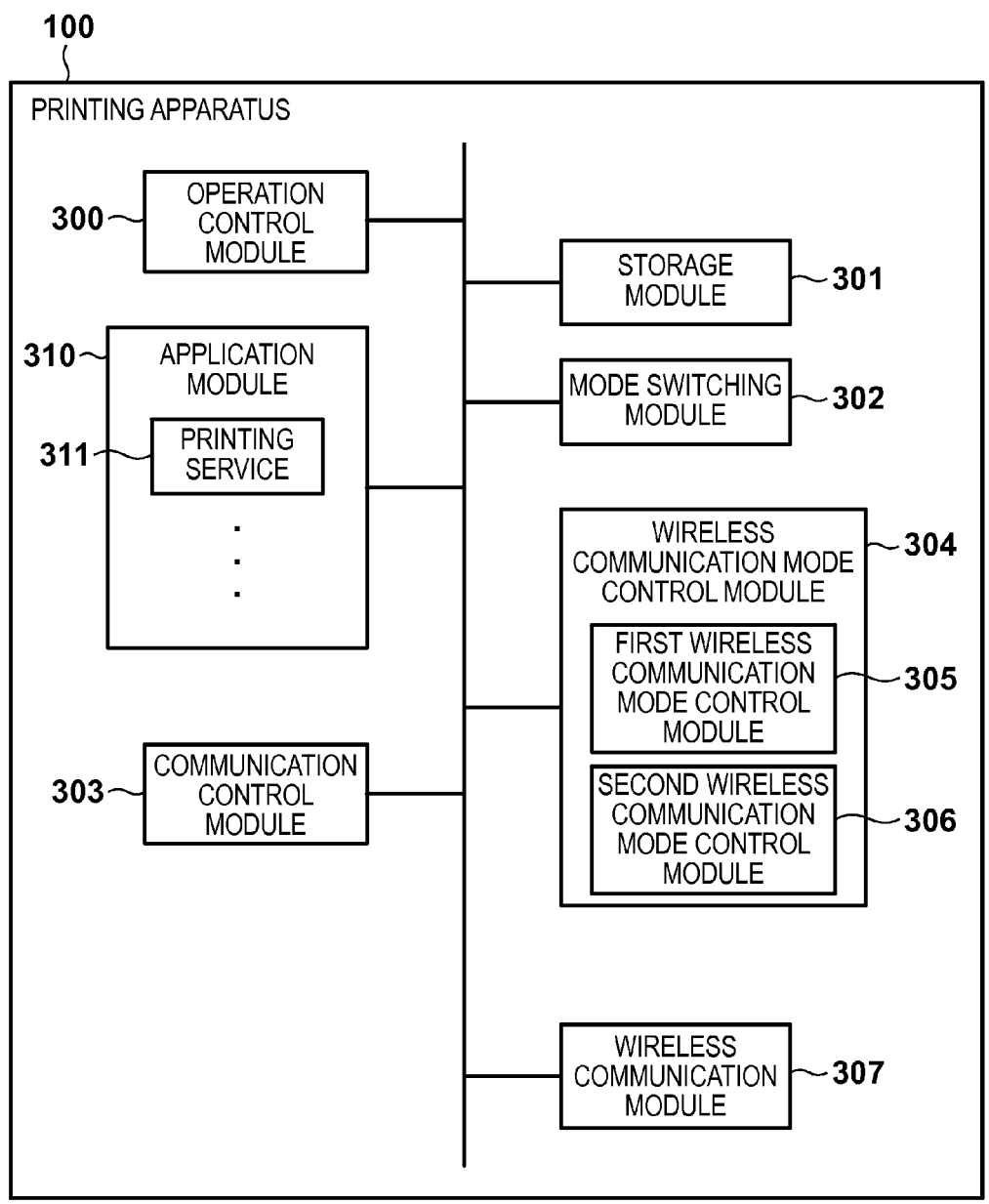
FIG. 13 is a block diagram for explaining a software configuration of the printing apparatus according to a fifth embodiment.

FIG. 13 is a functional block diagram for explaining a software configuration of the printing apparatus 100 according to a fifth embodiment.

Comparing to the software configuration of FIG. 3 according to the first embodiment, the configuration is such that the wired communication mode control module 308, the wired communication module 309, and the storage service 312 are removed from the configuration of FIG. 3. Other configuration elements are the same as those explained in the previously described first embodiment, and so explanation is omitted.

Figure 14:
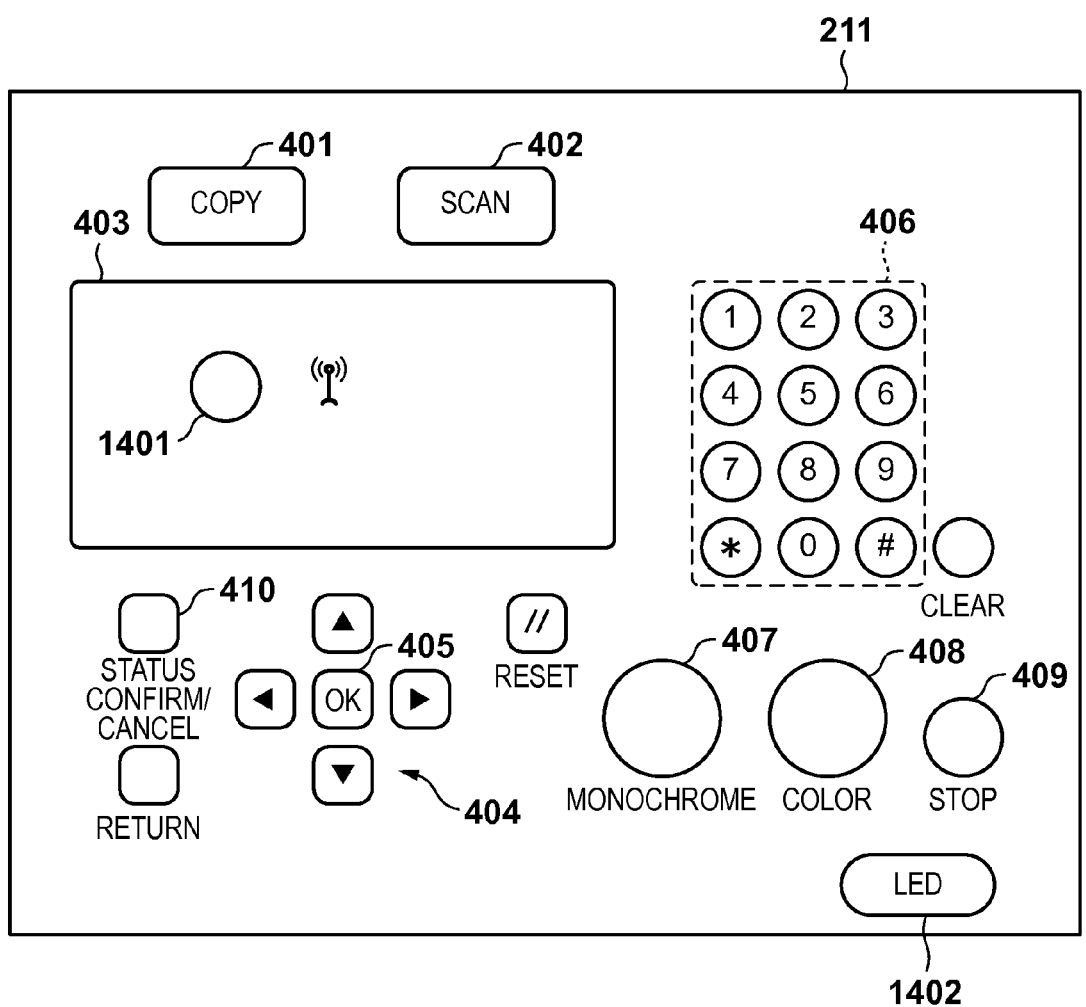
FIG. 14 is a top view of a control panel of the printing apparatus according to a fifth embodiment.

FIG. 14 is a top view of the control panel 211 of the printing apparatus 100 according to a fifth embodiment.

In the display unit 403 of the control panel 211, an execution key 1401 for switching the first wireless communication mode and the second wireless communication mode is displayed. Also, an LED 1402 for presenting the user with the current wireless communication status is arranged. Note, because other keys and buttons are the same as in the previously described FIG. 4A, explanation is omitted.

Figure 15:
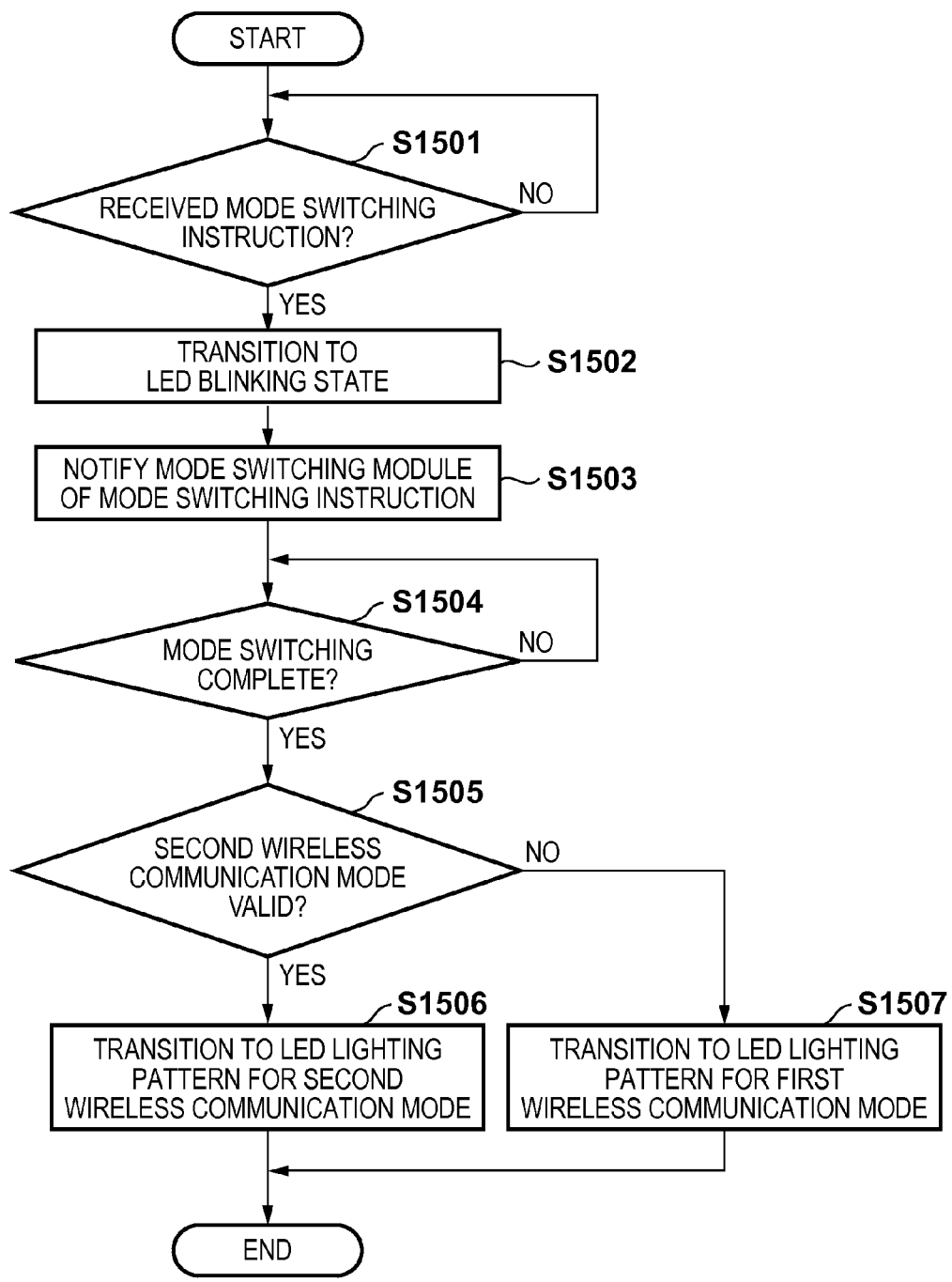
FIG. 15 is a flowchart for describing control processing for lighting of an LED in the printing apparatus according to a fifth embodiment.

FIG. 15 is a flowchart for describing control processing for lighting of an LED (light emitting device) in the printing apparatus 100 according to the fifth embodiment. Step S1501-step S1507 indicate processing steps that correspond to a flow for LED control processing that the operation control module 300 of the printing apparatus 100 performs when the user makes the communication mode switching instruction by pressing the execution key 1401 of the control panel 211. This processing is realized by a program by which the CPU 202 executes the control procedure corresponding to these steps being loaded into the RAM 203 of the controller 201 upon execution and the CPU 202 executing the program.

Firstly, in step S1501, the CPU 202 waits for the user to request a communication mode switching instruction via the control panel 211. When such a switching instruction is received, the processing proceeds to step S1502, and the CPU 202 causes the LED 1402 to blink. Next, the CPU 202 moves the processing to step S1503, sends notification to the mode switching module 302 of the occurrence of the communication mode switching instruction, and waits on the mode switching module 302 to reply that the switching completed in step S1504. In step S1504, when the CPU 202 receives the switching completion reply, it moves the processing to step S1505, and referencing the storage module 301, determines whether or not the currently valid communication mode after the switching is the second wireless communication mode. When it is determined that the second wireless communication mode is valid, the processing proceeds to step S1506, and the CPU 202 drives the LED 1402 to light up with a lighting pattern for the second wireless communication mode.

Meanwhile, in step S1505, when it is determined that the first wireless communication mode is valid, the processing proceeds to step S1507, and the CPU 202 drives the LED 1402 to light up with the lighting pattern for the first wireless communication mode. After the above processing is performed, the processing completes.

FIG. 16A is a view for illustrating an example of the lighting pattern for the first wireless communication mode in step S1507 of FIG. 15. FIG. 16B is a view for illustrating an example of the lighting pattern for the second wireless communication mode in step S1506 of FIG. 15.

As shown in FIG. 16A, in a case of wirelessly connecting in the first wireless communication mode, the operation control module 300 continuously lights the LED 1402. Because of this, the user can grasp that the printing apparatus 100 is currently in a state in which a connection is established with a surrounding access point in the first wireless communication mode and that communication is possible.

On the other hand, as illustrated in FIG. 16B, in a case of wirelessly connecting by the second wireless communication mode, the operation control module 300 controls the LED 1402 and periodically repeats a long duration lighting and a short duration non-lighting. Because of this, the user can recognize that the LED 1402 looks as though it is blinking, and that the printing apparatus 100 is operating in a wireless communication mode different to the first wireless communication mode shown in FIG. 16A.

Also, here, the operation control module 300 makes a query to the second wireless communication mode control module 306, and confirms the number of communication terminals that are currently directly wirelessly connected to the printing apparatus 100 by the second wireless communication mode. Then, the number of communication terminals that are directly wirelessly connected may be shown to the user by the number of times the short duration non-lighting is performed.

FIG. 16B shows a case where there are currently two communication terminals directly wirelessly connected to the printing apparatus 100 in the second wireless communication mode. For this reason, after a state in which the operation control module 300 lights the LED 1402 for a time period of 5000 ms, it performs the non-lighting two times for 100 ms. With this, the user can understand how many communication terminals the printing apparatus 100 is currently connected to by counting the number of times that the LED 1402 blinks periodically. Note, the lighting duration and the non-lighting duration are not limited to the above described times, and various values may be taken.

As explained above, by the fifth embodiment it becomes possible for the user to distinguish which communication mode out of a plurality of wireless communication modes is currently operating by the light emission status of an LED arranged on the printing apparatus 100 (a light emitting unit), without improvement to the hardware. Furthermore, in a case where the second wireless communication mode (Wi-Fi Direct mode) is operating, it becomes possible for the user to distinguish immediately how many communication terminals are connected to the printing apparatus 100.

Other Embodiments

In the above described embodiments, the second wireless communication mode is explained as Wi-Fi Direct, but the second wireless communication mode is not limited to Wi-Fi Direct. If an apparatus and another apparatus can execute wireless communication directly, other wireless communication can be applied as the second wireless communication mode.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-052432, filed Mar. 14, 2013, which is hereby incorporated by reference herein in its entirety.

What is claimed is:

1. A communication apparatus comprising:
a wireless communication unit configured to operate in either a first wireless communication mode in which the communication apparatus and an external apparatus execute wireless communication via an access point, and a second wireless communication mode in which the communication apparatus and an external apparatus execute the direct wireless communication that does not go through an access point;
a determination unit configured to determine whether or not it is possible to switch from the first wireless communication mode to the second wireless communication mode based on a communication status of the communication apparatus if the wireless communication unit is operating in the first wireless communication mode; and
a displaying unit configured to display a wireless menu screen in a state in which a user can input an instruction to start operation in the second wireless communication mode if it is determined by the determination unit that it is possible to switch from the first wireless communication mode to the second wireless communication mode, and configured to display a wireless menu screen in a state in which a user cannot input an instruction to start operation of the second wireless communication mode if it is determined by the determination unit that it is not possible to switch from the first wireless communication mode to the second wireless communication mode.

2. The communication apparatus according to claim 1, wherein the determination unit determines that it is possible to switch from the first wireless communication mode to the second wireless communication mode if no connected sessions exist,
and the determination unit determines that it is not possible to switch from the first wireless communication mode to the second wireless communication mode if a connected session exists.

3. The communication apparatus according to claim 1, wherein the second wireless communication mode is a communication mode for executing wireless communication based on Wi-Fi Direct.

4. The communication apparatus according to claim 1, wherein the communication apparatus is a printing apparatus for executing printing.

5. A communication apparatus comprising:
a wireless communication unit configured to operate in either a first wireless communication mode in which the communication apparatus and an external apparatus execute wireless communication via an access point, and a second wireless communication mode in which the communication apparatus and an external apparatus execute direct wireless communication that does not go through an access point;
a determination unit configured to determine whether or not it is possible to switch from the second wireless communication mode to the first wireless communication mode based on a communication status of the communication apparatus if the wireless communication unit is operating in the second wireless communication mode; and
a displaying unit configured to display a wireless menu screen in a state in which a user can input an instruction to start operation in the first wireless communication mode if it is determined by the determination unit that it is possible to switch from the second wireless communication mode to the first wireless communication mode, and configured to display a wireless menu screen in a state in which a user cannot input an instruction to start operation of the first wireless communication mode if it is determined by the determination unit that it is not possible to switch from the second wireless communication mode to the first wireless communication mode.

6. The communication apparatus according to claim 5, wherein the determination unit determines that it is possible to switch from the second wireless communication mode to the first wireless communication mode if no connected session exist, and the determination unit determines that it is not possible to switch from the second wireless communication mode to the first wireless communication mode if a connected session exists.

7. The communication apparatus according to claim 5, wherein the second wireless communication mode is a communication mode for executing wireless communication based on Wi-Fi Direct.

8. The communication apparatus according to claim 5, wherein the communication apparatus is a printing apparatus for executing printing.

9. A method of controlling communication apparatus, the method comprising:
operating in either a first wireless communication mode in which the communication apparatus and an external apparatus execute wireless communication via an access point, and a second wireless communication mode in which the communication apparatus and an external apparatus execute direct wireless communication that does not go through an access point;
determining whether or not it is possible to switch from the first wireless communication mode to the second wireless communication mode based on a communication status of the communication apparatus if operating in the first wireless communication mode; and
displaying a wireless menu screen in a state in which a user can input an instruction to start operation in the second wireless communication mode if it is determined that it is possible to switch from the first wireless communication mode to the second wireless communication mode, and displaying a wireless menu screen in a state in which a user cannot input an instruction to start operation of the second wireless communication mode if it is determined that it is not possible to switch from the first wireless communication mode to the second wireless communication mode.

10. A non-transitory computer-readable storage medium storing a program for causing a computer to function as a communication apparatus comprising:
a wireless communication unit configured to operate in either a first wireless communication mode in which the communication apparatus and an external apparatus execute wireless communication via an access point, and a second wireless communication mode in which the communication apparatus and an external apparatus execute direct wireless communication that does not go through an access point;
a determination unit configured to determine whether or not it is possible to switch from the first wireless communication mode to the second wireless communication mode based on a communication status of the communication apparatus if the wireless communication unit is operating in the first wireless communication mode; and
a displaying unit configured to display a wireless menu screen in a state in which a user can input an instruction to start operation in the second wireless communication mode if it is determined by the determination unit that it is possible to switch from the first wireless communication mode to the second wireless communication mode, and configured to display a wireless menu screen in a state in which a user cannot input an instruction to start operation of the second wireless communication mode if it is determined by the determination unit that it is not possible to switch from the first wireless communication mode to the second wireless communication mode.

11. A method of controlling a communication apparatus, the method comprising:
operating in either a first wireless communication mode in which the communication apparatus and an external apparatus execute wireless communication via an access point, and a second wireless communication mode in which the communication apparatus and an external apparatus execute direct wireless communication that does not go through an access point;
determining whether or not it is possible to switch from the second wireless communication mode to the first wireless communication mode based on a communication status of the communication apparatus if the wireless communication unit is operating in the second wireless communication mode; and
displaying a wireless menu screen in a state in which a user can input an instruction to start operation in the first wireless communication mode if it is determined that it is possible to switch from the second wireless communication mode to the first wireless communication mode, and displaying a wireless menu screen in a state in which a user cannot input and instruction to start operation the first wireless communication mode if it is determined that it is not possible to switch from the second wireless communication mode to the first wireless communication mode.

12. A non-transitory computer-readable storage medium storing a program for causing a computer to function as a communication apparatus comprising:
a wireless communication unit configured to operate in either a first wireless communication mode in which the communication apparatus and an external apparatus execute wireless communication via an access point, and a second wireless communication mode in which the communication apparatus and an external apparatus execute direct wireless communication that does not go through an access point;
a determination unit configured to determine whether or not it is possible to switch from the second wireless communication mode to the first wireless communication mode based on a communication status of the communication apparatus if the wireless communication unit is operating in the second wireless communication mode; and
a displaying unit configured to display a wireless menu screen in a state in which a user can input an instruction to start operation in the first wireless communication mode if it is determined by the determination unit that it is possible to switch from the second wireless communication mode to the first wireless communication mode, and configured to display a wireless menu screen in a state in which a user cannot input an instruction to start operation of the first wireless communication mode if it is determined by the determination unit that it is not possible to switch from the second wireless communication mode to the first wireless communication mode.

* * * * *